(12) United States Patent
Lober et al.

(10) Patent No.: US 11,648,183 B2
(45) Date of Patent: May 16, 2023

(54) METERING APPARATUS AND METHOD FOR OPERATING A METERING APPARATUS

(71) Applicant: Harro Hoefliger Verpackungsmaschinen GmbH, Allmersbach im Tal (DE)

(72) Inventors: Martin Lober, Allmersbach im Tal (DE); Peter Schroeppel, Allmersbach im Tal (DE); Achim Wolf, Allmersbach im Tal (DE); Karlheinz Seyfang, Allmersbach im Tal (DE); Uwe Blum, Murrhardt (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 17/208,713

(22) Filed: Mar. 22, 2021

(65) Prior Publication Data

US 2021/0338532 A1    Nov. 4, 2021

(30) Foreign Application Priority Data

Apr. 30, 2020   (EP) .................................... 20172512

(51) Int. Cl.
*A61J 7/00* (2006.01)
*G01F 13/00* (2006.01)

(52) U.S. Cl.
CPC .......... *A61J 7/0084* (2013.01); *G01F 13/005* (2013.01)

(58) Field of Classification Search
CPC ..... G01F 13/005; B65G 33/14; B65G 33/265; B65G 65/463; B65B 1/12; B65B 37/10
See application file for complete search history.

(56) References Cited

U.S. PATENT DOCUMENTS

| | | | | |
|---|---|---|---|---|
| 2,114,103 A | * | 4/1938 | Driscoll | B65B 1/12 |
| | | | | 141/73 |
| 3,184,036 A | * | 5/1965 | Reed | B65G 33/14 |
| | | | | 198/359 |
| 3,349,894 A | * | 10/1967 | Allen | B65G 33/26 |
| | | | | 198/658 |
| 4,852,719 A | * | 8/1989 | Lapeyre | B65G 33/12 |
| | | | | 198/677 |

(Continued)

FOREIGN PATENT DOCUMENTS

| | | |
|---|---|---|
| GN | 209889222 U | 1/2020 |
| JP | H09100017 A | 4/1997 |

(Continued)

*Primary Examiner* — Donnell A Long
(74) *Attorney, Agent, or Firm* — Walter Ottesen, P.A.

(57) ABSTRACT

The disclosure relates to a metering apparatus for free-flowing material and to a method for operating such a metering apparatus. The metering apparatus has a metering duct having a closed cross section and further has a rotary drive (M). The metering duct is wound in the form of a screw with a vertical longitudinal axis. The free-flowing material is fed to the metering duct. The metering duct is set via the rotary drive (M) in an oscillating rotary motion about its longitudinal axis with individual rotary strokes, wherein, with each rotary stroke, a partial quantity of the free-flowing material falls out of a lower discharge opening of the metering duct.

10 Claims, 3 Drawing Sheets

(56) References Cited

U.S. PATENT DOCUMENTS

| | | | | |
|---|---|---|---|---|
| 5,564,606 A | * | 10/1996 | Engel | ........................ B05C 5/02 |
| | | | | 222/413 |
| 6,386,396 B1 | * | 5/2002 | Strecker | ................ G01F 13/005 |
| | | | | 222/413 |
| 2019/0233140 A1 | | 8/2019 | Rapparini | |

FOREIGN PATENT DOCUMENTS

| | | | |
|---|---|---|---|
| JP | 2007153396 A | 6/2007 | |
| WO | WO-2004067414 A1 * | 8/2004 | ............. B65G 33/20 |

* cited by examiner

METERING APPARATUS AND METHOD FOR OPERATING A METERING APPARATUS

CROSS REFERENCE TO RELATED APPLICATION

This application claims priority of European patent application no. 20 172 512.4, filed Apr. 30, 2020, the entire content of which is incorporated herein by reference.

TECHNICAL FIELD

The disclosure relates to a metering apparatus for free-flowing material, in particular for pharmaceutical powder, granular material, microtablets or the like, and to a method for operating such a metering apparatus.

BACKGROUND

In particular in the pharmaceutical sector, powders, granular materials, microtablets or other free-flowing material are processed, wherein target containers, such as two-piece capsules, blister packs or the like, have to be filled with a specific target quantity. The metering of such target quantities is an important task in which high repeat accuracy under industrial usage conditions is essential. However, the materials in question differ markedly in their characteristics, so that, depending on the material to be metered, different metering systems and methods are employed.

Auger fillers or slide fillers enjoy widespread use. In the case of the auger filler, a metering auger rotates in a surrounding housing, whereby the material is conveyed and metered. In the case of the slide filler, a linearly movable slide contains an, in terms of its volume, exactly dimensioned metering opening, which, in one slide setting, is filled with the material to be metered and, in another slide setting, is emptied into the target container. It has been observed, however, that the use of such metering systems, in particular in respect of sensitive materials such as granular material, taste-masked powders or the like, can lead to reductions in quality and, moreover, to an undesirable dust formation. Use under closed-off containment conditions, and maintenance and cleaning works, are difficult.

SUMMARY

It is an object of the invention to provide a metering apparatus with which sensitive materials can be metered in a gentle manner.

This object can, for example, be achieved by a metering apparatus for free-flowing material. The metering apparatus includes: a metering duct defining a closed cross section and a vertical longitudinal axis; a rotary drive; and, the metering duct being wound in the form of a screw and the rotary drive being configured to generate an oscillating rotary motion of the metering duct about the vertical longitudinal axis.

It is a further object of the invention to provide a method for the gentle metering of sensitive materials.

This object can, for example, be achieved by a method for operating a metering apparatus for free-flowing material. The metering apparatus has a metering duct defining a closed cross section and a vertical longitudinal axis, the metering apparatus further having a rotary drive, the metering duct being wound in the form of a screw and the rotary drive being configured to generate an oscillating rotary motion of the metering duct about the vertical longitudinal axis. The method includes the steps of: feeding the free-flowing material to the metering duct; and, setting the metering duct in an oscillating rotary motion with individual rotary strokes, wherein, with each rotary stroke, a partial quantity of the free-flowing material falls out of a lower discharge opening of the metering duct.

According to the disclosure, it is provided that the metering apparatus includes a metering duct, having a closed cross section, and a rotary drive, wherein the metering duct is wound in the form of a screw with a vertical longitudinal axis, and wherein the rotary drive is configured for an oscillating rotary motion of the metering duct about its vertical longitudinal axis. In an associated method according to the disclosure, the free-flowing material is fed to the metering duct. The metering duct is subsequently set in an oscillating rotary motion with individual rotary strokes, wherein, with each rotary stroke, a partial quantity of the free-flowing material falls out of a lower discharge opening of the metering duct.

The disclosure is firstly based on the recognition that, both in conventional auger fillers and in conventional slide fillers, the material to be metered is subjected to a shearing load. Shearing relative movements in relation to the surrounding housing wall hereupon ensue, with the consequence of abrasion, dust formation and quality loss.

By contrast, according to the disclosure, such a shearing load does not materialize. The metering duct with its closed cross section is set in its entirety in an oscillating rotary motion, without individual parts thereof undergoing a mutual displacement.

Rather, embodiments according to the disclosure function according to the following principle: It should firstly be noted that "oscillating rotary motion" is understood within the meaning of the disclosure as a rotary motion with accelerations that change direction and with an intervening acceleration-free phase. In the acceleration-free phase, the material to be metered rests by virtue of its weight on the oblique bottom surface of the helical metering duct without slipping through downward. Upon a rotary acceleration against the pitch of the metering duct, the contact pressure force of the material against the base is intensified, so that any slipping through continues to be avoided. Upon the rotary acceleration in the opposite direction, the contact pressure force diminishes, however, which results in a loosening of the powder.

In this phase, here referred to as negative acceleration, given sufficient acceleration amplitude the inner holding forces, due to the loosening, possibly due to an induced fluidization, are temporarily surmounted, so that the material to be metered does not follow the rearward rotary motion of the metering duct, but rather slips through downward and passes out of the lower discharge opening of the metering duct. Duct cross section, inlet and outlet cross section, acceleration amplitude and oscillation frequency can readily be adapted to the powder characteristics such that, with each rotary stroke and given negative acceleration, a specific, predefined quantity of the material passes out of the discharge opening, whereby a precise metering is created. This process is attributable solely to the acceleration of the rotary oscillation, without any part being played by mechanical relative motions of individual components in the direct area of influence of the material to be metered. Material abrasion, dust formation and the like is reduced to a minimum, so that, in particular in this respect, sensitive materials such as granular materials, taste-masked powders, microtablets or the like can be metered gently and without loss of quality. This is also accompanied by a reduced environmental pollution resulting from released dust or the like, which is of advantage for the processing of highly potent, possibly also toxic, substances, and facilitates use in closed containment systems. Smaller unavoidable dust quantities are reliably detained by the closed duct cross section. The accompanying cleaning effort is reduced to a minimum.

In particular due to the closed structural form, with a metering apparatus according to the disclosure metering or conveyance can be carried out easily and economically, including under inert gas or similar. Moreover, comparatively large duct cross sections can be realized, and consequently high conveying or metering outputs can be obtained. Hence not only is use restricted to metering directly into a target container; rather, a metering apparatus according to the disclosure can also be used, for instance, as an upstream supply system for a metering system.

It can be expedient to construct the metering duct as a helically wound tube or the like. In a refinement, it is configured in the form of a core, an auger encompassing the core, and a casing enclosing the core and the auger, wherein the core, the auger and the casing are connected to one another in a rotationally secure manner to form a rotary unit. As a result, comparatively large duct cross sections can be realized in a compact structural form which, besides a reproducible conveying behavior, additionally offers good accessibility, for instance for cleaning purposes.

In particular with regard to the last aspect, it can be expedient for the metering duct to have a casing which can at least partially be opened or dismantled. In the opened or dismantled state, good accessibility is ensured such that a cleaning is possible even under difficult conditions, for instance within a containment system. In the closed or assembled state, there is further formed, however, a rotationally secure unit, which, avoiding relative motions, is in the conveying process gentle on the material to be metered.

It can be expedient to make the metering duct oscillate about a fixed zero point. Preferably, there is provided, however, a rotary drive, which acts in just one rotational direction. The metering duct, after each rotary stroke, here comes to rest in a different angular setting. In particular in conjunction with a discharge opening, positioned eccentrically to the longitudinal axis, of the metering duct, individual partial quantities of the material to be metered can be ejected sequentially at different places, which enables the filling of a plurality of target containers, positioned in a ring formation under the metering apparatus, with metered partial quantities.

Depending on the flow behavior of the material to be conveyed, it can be expedient to operate a metering apparatus according to the disclosure such that the cross section of the metering duct is only partially filled. This allows the sufficient loosening, where appropriate, fluidization, even of poorly flowable materials. Alternatively, it can also, however, be expedient to fully fill the cross section of the metering duct. Fluctuations in the fill level height within the metering duct are precluded, which can be of benefit to the metering accuracy.

BRIEF DESCRIPTION OF THE DRAWINGS

The invention will now be described with reference to the drawings wherein.

DESCRIPTION OF THE PREFERRED EMBODIMENTS

Figure 1:
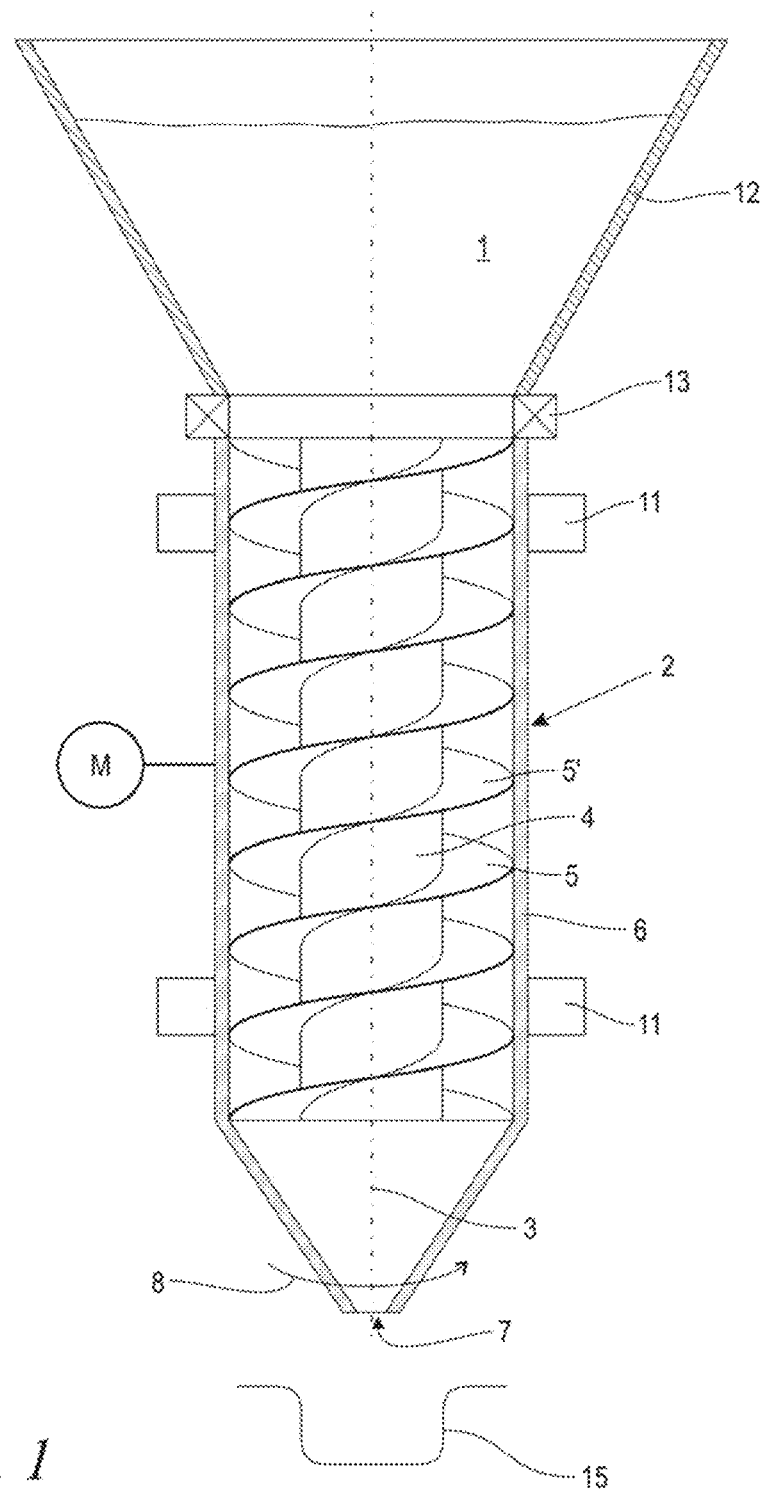
FIG. 1 shows in a schematic longitudinal sectional representation a first embodiment of a metering apparatus according to the disclosure including a metering duct in the form of a double-flight auger having a centric discharge opening.

FIG. 1 shows in a schematic longitudinal sectional representation a first embodiment of a metering apparatus according to the disclosure for free-flowing material 1 which, by way of example, is held in store in a hopper 12. The free-flowing material 1 is here a pharmaceutical powder. However, it can also be constituted by granular material, microtablets or the like from the pharmaceutical sector, from the food supplements sector or from any other chosen sectors.

The metering apparatus includes a metering duct 2, which extends along a longitudinal axis 3 running vertically in the gravitational direction, and a rotary drive M for an oscillating rotary motion of the metering duct 2 about the longitudinal axis 3. In the shown embodiment, the metering duct is formed by a cylindrical core 4, by at least one auger 5 encompassing the core 4, and by a casing 6 enclosing core 4 and the auger 5, wherein two augers 5, 5' are here arranged in accordance with a double thread. The core 4, the two augers 5, 5' and the casing 6 are connected to one another in a rotationally secure manner to form a rotary unit. Consequently, a duct with closed cross section is here formed, which duct is wound in double-flight arrangement in the form of a screw about the vertical longitudinal axis. The metering duct 2 is mounted in its entirety, inclusive of the core 4, the augers 5, 5' and the casing 6, in upright arrangement in bearings 11 rotatably about the vertical longitudinal axis 3. The hopper 12 is fixed, that is, does not co-rotate with the metering duct 2. Between the two is found a seal 13. However, a co-rotating embodiment of the hopper 12 can also be expedient. In any event, it is ensured that the free-flowing material 1 makes its way, without losses, out of the hopper into the metering duct 2.

In the embodiment according to FIG. 1, the metering duct 2 has, at its, in the gravitational direction, lower end, a discharge opening 7, which lies centrically on the longitudinal axis 3 and beneath which is positioned a target cavity 15. The target cavity 15 can be a cup, a blister, a two-piece capsule or the like. However, any other target containers can also be considered. During operation, the metering duct 2 is set in an oscillating rotary motion via the rotary drive M. The rotary drive M, which is here indicated only schematically, can be constituted by an electric motor with crank mechanism or link mechanism. For a controlled rotary motion, a step motor, a servo motor or the like can also, however, be employed. The oscillating rotary motion can be made about a fixed zero point. In the shown embodiment, an oscillating, yet progressive rotary motion is generated in just one rotational direction 8. Further details hereto are described more closely in association with FIG. 3.

In the operating mode according to FIG. 1, the free cross section of the double-flight metering duct 2 is fully filled with the free-flowing material 1. The geometry of the arrangement is tailored in such a way to the flow behavior of the free-flowing material 1 that it remains in place in the metering duct 2 without rotary motion and without rotary acceleration. Upon a rotational acceleration in the rotational direction 8 coinciding with the pitches of the augers 5, 5', the material filling of the metering duct 2 is loosened, which results in a temporary flowing, within the metering duct 2, of the material 1 to be metered. Since the rotary acceleration due to the oscillating motion is exactly time-limited, the loosening too is in the same way exactly time-limited, so that, by way of this time control, a correspondingly dimensioned partial quantity of the material 1 makes its way to the discharge opening 7 and falls from there into the target cavity 15.

Figure 2:
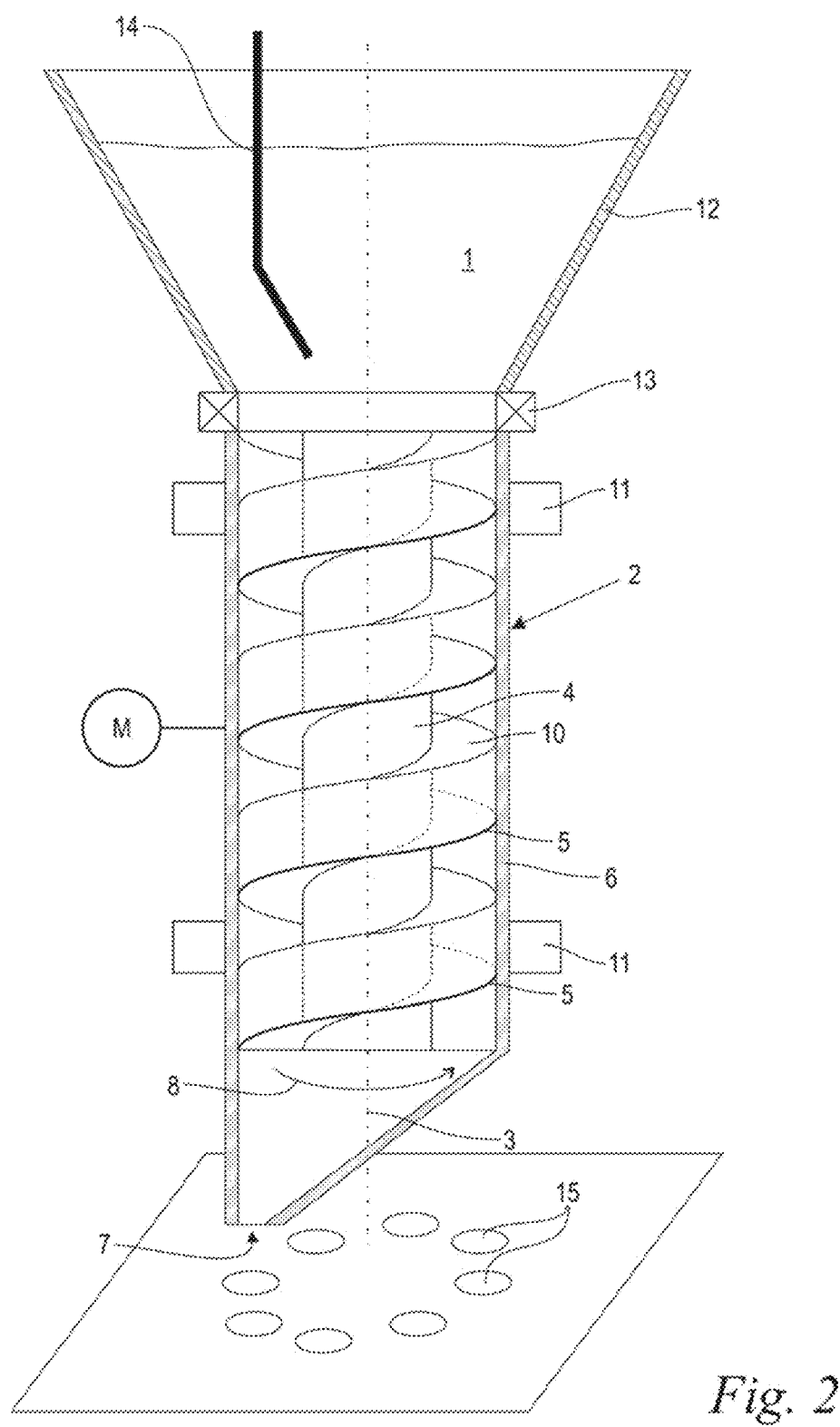
FIG. 2 shows a variant according to FIG. 1 having a partially filled single-flight auger and having an eccentric discharge opening.

FIG. 2 shows in a schematic longitudinal sectional representation a variant of the metering apparatus according to FIG. 1. Here, only one auger 5 is provided for the formation of a metering duct 2 wound helically in single flight. Moreover, the discharge opening 7 is positioned eccentrically to the longitudinal axis 3. In the hopper 12 is further found an optional agitator 14 for the loosening and homogenization of the free-flowing material 1, whereby the entry thereof into the metering duct 2 is facilitated.

A first deviation in the operating method from that according to FIG. 1 consists in the fact that here the cross section of the metering duct 2 is only partially filled with the free-flowing material 1 with the formation of a free surface 10. A further deviation in the operating method consists in the fact that here a plurality of target cavities 15 are positioned beneath the metering duct 2 in a ring formation about the longitudinal axis 3 and here lie in the same radius thereto as the discharge opening 7. Via individual rotary strokes 9, described in greater detail in association with FIG. 3, in the rotational direction 8, the individual target cavities 15 can be approached with the discharge opening 7, so that here appropriately metered partial quantities of the free-flowing material 1 fall in.

In terms of the other features and reference symbols, the embodiment according to FIG. 2 tallies with that according to FIG. 1. The features which are described as deviating can be employed singly and reciprocally in the respectively other embodiment. Thus it is possible, for instance, also to construct the eccentric metering duct 2 according to FIG. 2 in multi-flight configuration, or to operate this with a fully filled duct cross section. Conversely, it is possible also to provide the eccentric embodiment according to FIG. 1 with just one metering duct 2 which is wound in single flight, and/or to operate this only partially filled.

Figure 3:
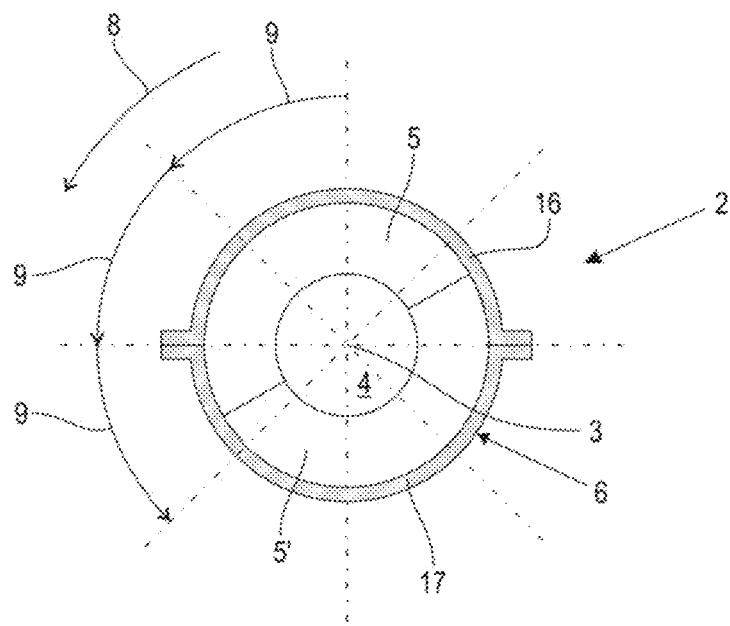
FIG. 3 shows in a cross-sectional representation the metering apparatus according to FIG. 1 with details relating to its closed casing and the stepwise oscillating rotary motion; and, FIG. 4 shows the arrangement according to FIG. 3 with casing partially opened for cleaning purposes.

FIG. 3 shows in a cross-sectional representation the arrangement according to FIG. 1 including the core 4, the two augers 5, 5' wound around the core 4, and further including the outer casing 6. The casing 6 is here formed by two half-shell-shaped casing parts 16, 17, which are detachably connected to one another. The same applies to the embodiment according to FIG. 2, having just one auger 5.

The rotary drive M described in association with FIGS. 1 and 2 here acts in just one rotational direction 8, such that the metering duct 2, on the one hand, performs a rotary motion oscillating about the longitudinal axis 3 and, on the other hand, with each rotary oscillation, performs a rotary stroke 9 in the rotational direction 8. In other words, the metering duct 2 is initially at rest, is then accelerated in the rotational direction 8, and finally, when the next rotational angular position is reached, is decelerated to zero. The acceleration and deceleration bring about the previously described loosening of the material 1 (FIGS. 1, 2), and hence the discharge of a metered partial quantity from the discharge opening 7 (FIGS. 1, 2). The respective rotary stroke 9 and the respective stop positions are tailored to the positions of the target cavities 15, so that the discharged material 1 makes its way into the target cavities 15. Given the same pitch direction of the auger 5, rotational direction 8 and rotary stroke 9 can also be chosen in the direction opposite to the representation according to FIG. 3. In this case, the retardation at the end of each single rotary stroke 9, in the form of a negative acceleration, brings about the above-described loosening of the material 1, and hence the temporary conveyance thereof.

Figure 4:
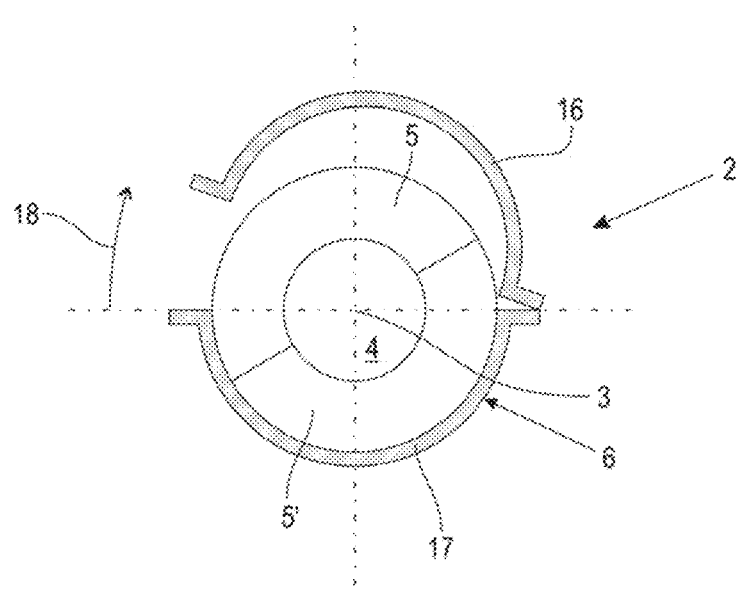

FIG. 4 shows the arrangement according to FIG. 3, wherein the one casing part 16 is detached from the other casing part 17 and is swung open in accordance with an arrow 18. As a result, the interior of the metering duct 2 is freely accessible for cleaning purposes. The remaining casing part 17 can remain fixedly connected to the augers 5, 5'. Instead of a hinge-like swinging open of the casing part 16, a complete removal can also be expedient. Likewise, it is an option to remove both casing parts 16, 17 for cleaning purposes. For operation, both casing parts 16, 17, however, are brought into the closed position according to FIG. 3, wherein they form, together with the augers 5, 5' and the core 4, a rotationally secure unit of the metering duct 2 with closed duct cross section.

It is understood that the foregoing description is that of the preferred embodiments of the invention and that various changes and modifications may be made thereto without departing from the spirit and scope of the invention as defined in the appended claims.

What is claimed is:

1. A metering apparatus for free-flowing material, the metering apparatus comprising:
   a metering duct defining a closed cross section, a vertical longitudinal axis, and a lower discharge opening;
   a rotary drive; and,
   said metering duct being wound in the form of a screw and said rotary drive being configured to generate an oscillating rotary motion of all of said metering duct about the vertical longitudinal axis.

2. The metering apparatus of claim 1, wherein said metering duct includes a core, an auger encompassing said core, and a casing enclosing said core and said auger; and, said core, said auger and said casing are connected to one another in a rotationally secure manner to form a rotary unit.

3. The metering apparatus of claim 1, wherein said rotary drive acts in just one rotational direction.

4. The metering apparatus of claim 1, wherein said lower discharge opening is positioned eccentrically to the vertical longitudinal axis; and, said rotary drive is configured to perform a rotary stroke such that said discharge opening is positioned in a different angular setting after each rotary stroke.

5. The metering apparatus of claim 1, wherein said metering duct has a casing, which can be at least partially opened or dismantled.

6. The metering apparatus of claim 1, wherein the free-flowing material is at least one of a pharmaceutical powder, a granular material, and microtablets.

7. A method for operating a metering apparatus for free-flowing material, the metering apparatus having a metering duct defining a closed cross section and a vertical longitudinal axis, the metering apparatus further having a rotary drive, the metering duct being wound in the form of a screw and the rotary drive being configured to generate an oscillating rotary motion of the metering duct about the vertical longitudinal axis, the method comprising the steps of:

feeding the free-flowing material to the metering duct; and, setting all of the metering duct in an oscillating rotary motion with individual rotary strokes, wherein, with each rotary stroke, a partial quantity of the free-flowing material falls out of a lower discharge opening of the metering duct.

8. The method as claimed in claim 7, wherein the lower discharge opening is positioned eccentrically to the longitudinal axis of the metering duct; and, said metering duct, after each rotary stroke, is positioned in a different angular setting.

9. The method of claim 7, wherein the cross section of the metering duct is only partially filled with the free-flowing material.

10. The method of claim 7, wherein the cross section of the metering duct is fully filled with the free-flowing material.

\* \* \* \* \*

UNITED STATES PATENT AND TRADEMARK OFFICE
CERTIFICATE OF CORRECTION

| | | |
|---|---|---|
| PATENT NO. | : 11,648,183 B2 | Page 1 of 1 |
| APPLICATION NO. | : 17/208713 | |
| DATED | : May 16, 2023 | |
| INVENTOR(S) | : Martin Lober et al. | |

It is certified that error appears in the above-identified patent and that said Letters Patent is hereby corrected as shown below:

On the Title Page

Under item (56), Line 1, "FOREIGN PATENT DOCUMENTS": delete "GN" and substitute -- CN --.

Signed and Sealed this
Fifth Day of September, 2023

Katherine Kelly Vidal
*Director of the United States Patent and Trademark Office*